(12) United States Patent
Padfield

(10) Patent No.: US 11,972,226 B2
(45) Date of Patent: Apr. 30, 2024

(54) STABLE REAL-TIME TRANSLATIONS OF AUDIO STREAMS

(71) Applicant: Google LLC, Mountain View, CA (US)

(72) Inventor: Dirk Ryan Padfield, Seattle, WA (US)

(73) Assignee: Google LLC, Mountain View, CA (US)

( * ) Notice: Subject to any disclaimer, the term of this patent is extended or adjusted under 35 U.S.C. 154(b) by 468 days.

(21) Appl. No.: 17/269,800

(22) PCT Filed: Mar. 23, 2020

(86) PCT No.: PCT/US2020/024277
§ 371 (c)(1),
(2) Date: Feb. 19, 2021

(87) PCT Pub. No.: WO2021/158247
PCT Pub. Date: Aug. 12, 2021

(65) Prior Publication Data
US 2022/0121827 A1    Apr. 21, 2022

Related U.S. Application Data

(60) Provisional application No. 62/970,892, filed on Feb. 6, 2020.

(51) Int. Cl.
*G06F 40/58*    (2020.01)
*G10L 15/00*    (2013.01)
(Continued)

(52) U.S. Cl.
CPC ............ *G06F 40/58* (2020.01); *G10L 15/005* (2013.01); *G10L 15/063* (2013.01); *G10L 15/197* (2013.01); *G10L 15/22* (2013.01)

(58) Field of Classification Search
CPC ..... G06F 40/58; G10L 15/005; G10L 15/063; G10L 15/197; G10L 15/22; G06N 3/045; G06N 3/08; G06N 20/00
(Continued)

(56) References Cited

U.S. PATENT DOCUMENTS 8,594,992 B2 * 11/2013 Kuhn .................... G06F 40/103
704/4
9,710,429 B1 * 7/2017 Raghunath .............. G06F 40/00
(Continued)

FOREIGN PATENT DOCUMENTS

CN    102880601    1/2013
CN    104115141    10/2014
(Continued)

OTHER PUBLICATIONS

International Preliminary Report on Patentability in International Appln. No. PCT/US2020/024277, dated Aug. 18, 2022, 9 pages.
(Continued)

*Primary Examiner* — Thuykhanh Le
(74) *Attorney, Agent, or Firm* — Fish & Richardson P.C.

(57) ABSTRACT

Methods, systems, and apparatus, including computer programs encoded on a computer storage medium, that facilitate generating stable real-time textual translations in a target language of an input audio data stream that is recorded in a source language. An audio stream that is recorded in a first language is obtained. A partial transcription of the audio can be generated at each time interval in a plurality of successive time intervals. Each partial transcription can be translated into a second language that is different from the first language. Each translated partial transcription can be input to a model that determines whether a portion of an input translated partial transcription is stable. Based on the input translated partial transcription, the model identifies a portion of the translated partial transcription that is predicted to be stable. This stable portion of the translated partial transcription is provided for display on a user device.

16 Claims, 8 Drawing Sheets

(51) Int. Cl.
*G10L 15/06* (2013.01)
*G10L 15/197* (2013.01)
*G10L 15/22* (2006.01)

(58) Field of Classification Search
USPC .................................................. 704/3
See application file for complete search history.

(56) References Cited

U.S. PATENT DOCUMENTS

| | | | |
|---|---|---|---|
| 11,315,569 B1* | 4/2022 | Talieh | H04L 12/1831 |
| 11,514,948 B1* | 11/2022 | Nair | G06F 16/2365 |
| 11,545,134 B1* | 1/2023 | Federico | G10L 13/033 |
| 2007/0192110 A1* | 8/2007 | Mizutani | G06F 40/58 |
| | | | 704/277 |
| 2008/0177786 A1 | 7/2008 | Faisman et al. | |
| 2011/0248914 A1 | 10/2011 | Sherr | |
| 2011/0307435 A1* | 12/2011 | Overell | G06F 16/367 |
| | | | 706/46 |
| 2012/0035907 A1* | 2/2012 | Lebeau | G10L 13/00 |
| | | | 704/235 |
| 2012/0123766 A1* | 5/2012 | Anisimovich | G06F 40/51 |
| | | | 704/3 |
| 2014/0358516 A1* | 12/2014 | Lin | G06F 40/58 |
| | | | 704/2 |
| 2017/0017642 A1 | 1/2017 | Cunningham et al. | |
| 2018/0336900 A1* | 11/2018 | Zou | G06F 40/51 |
| 2019/0065476 A1* | 2/2019 | Kwon | G06V 20/62 |
| 2019/0138268 A1* | 5/2019 | Andersen | G06F 16/90332 |
| 2019/0139541 A1* | 5/2019 | Andersen | G10L 25/48 |
| 2020/0042602 A1* | 2/2020 | Anderson | G06F 40/56 |
| 2020/0051582 A1* | 2/2020 | Gilson | H04N 21/233 |
| 2020/0213680 A1* | 7/2020 | Ingel | H04N 21/44008 |
| 2020/0294500 A1* | 9/2020 | Ferris | G10L 15/22 |
| 2021/0034662 A1* | 2/2021 | Aher | G10L 15/1807 |
| 2021/0090548 A1* | 3/2021 | Debner | G10L 13/086 |
| 2021/0133476 A1* | 5/2021 | Goodman | G06F 18/214 |
| 2021/0158813 A1* | 5/2021 | Sivasubramanian | |
| | | | G06Q 10/107 |
| 2021/0165973 A1* | 6/2021 | Kofman | G06F 40/30 |
| 2021/0182902 A1* | 6/2021 | Scott-Green | G10L 15/22 |
| 2021/0183400 A1* | 6/2021 | Cevette | G06F 3/167 |
| 2021/0224319 A1* | 7/2021 | Ingel | G06F 16/686 |
| 2021/0369042 A1* | 12/2021 | Gustman | A47J 31/407 |
| 2022/0122579 A1* | 4/2022 | Biadsy | G06N 3/08 |
| 2022/0181020 A1* | 6/2022 | Keshavjee | G06V 10/28 |
| 2022/0222449 A1* | 7/2022 | Zotto | H04N 7/15 |
| 2022/0277150 A1* | 9/2022 | Gonzalez de Langarica | |
| | | | H04W 4/16 |
| 2022/0286310 A1* | 9/2022 | Rathnam | G06F 3/0482 |
| 2022/0310109 A1* | 9/2022 | Donsbach | G10L 17/24 |
| 2022/0405492 A1* | 12/2022 | Rathnam | G06F 40/58 |
| 2022/0414349 A1* | 12/2022 | Rathnam | G06F 40/58 |
| 2023/0021300 A9* | 1/2023 | Rathnam | G10L 15/005 |

FOREIGN PATENT DOCUMENTS

| | | |
|---|---|---|
| JP | 2001-117920 | 4/2001 |
| JP | 2015-201215 | 11/2015 |
| JP | 2016-071761 | 5/2016 |
| JP | 2018-195276 | 12/2018 |
| WO | WO 2011033834 | 3/2011 |

OTHER PUBLICATIONS

EP Office Action in European Appln. No. 20719060.4, dated Aug. 25, 2022, 6 pages.

PCT International Search Report and Written Opinion in International Appln. No. PCT/US2020/024277, dated Oct. 5, 2020, 13 pages.

Chousa et al., "Neural Machine Translation Using Connectionist Temporal Classification for Simultaneous Translation" Information Processing Society of Japan Research Report Natural Language Processing, Information Processing Society of Japan, vol. 2019-NL-241 No. 20, Aug. 22, 2019, 9 pages (with English abstract).

Office Action in Japanese Appln. No. 2022-548003, mailed on Nov. 6, 2023, 11 pages (with English translation).

Office Action in Chinese Appln. No. 202080004986.3, mailed on Dec. 6, 2023, 19 pages (with English translation).

* cited by examiner

Conjunto
Fabricantes de sets
Establecer fabricantes Feud sobre el asiento
Establecer fabricantes Feud sobre el asiento con.
Establecer fabricantes Feud sobre el asiento con
Establecer fabricantes Feud sobre el asiento con con.
Establecer fabricantes Feud sobre el asiento con con
Establecer fabricantes Feud sobre el asiento con gran
Establecer fabricantes Feud sobre el asiento con grandes pedidos
Establecer fabricantes Feud sobre el asiento con grandes pedidos en
Establecer fabricantes Feud sobre el asiento con grandes pedidos en el estado.

STABLE REAL-TIME TRANSLATIONS OF AUDIO STREAMS

CROSS-REFERENCE TO RELATED APPLICATION

This application is a National Stage Application under 35 U.S.C. § 371 and claims the benefit of International Application No. PCT/US2020/024277, filed Mar. 23, 2020, which claims priority to U.S. Application No. 62/970,892, filed Feb. 6, 2020, entitled STABLE REAL-TIME TRANSLATIONS OF AUDIO STREAMS, the disclosure of which is incorporated herein by reference.

BACKGROUND

This specification generally relates to generating stable real-time textual translations in a target language of an input audio data stream that is recorded in a source language.

A real-time translation system aims to provide real-time textual translations in a target language of an audio stream that is recorded in a source language. In other words, a real-time translation system aims to generate textual translations of the audio stream as (or shortly after) such systems receive the audio stream. Generally, conventional real-time systems generate textual translation of an initial portion of the received audio stream shortly after that portion of the stream has been received. As an additional portion of the audio stream is received, these systems generate an updated textual translation of the audio from the beginning of the stream until the end of the additional portion. This process continues until the entire audio stream has been translated. FIG. 1 shows an example of a chronological list of real-time Spanish translations of an audio stream of a sentence ("Set makers Feud over seat with big orders at state") that is generated by a conventional real-time translation system. Note that the example sentence shown in FIG. 1 includes errors resulting from an automatic machine translation (the original sentence spoken by was "Jet makers feud over seat width with big orders at stake").

Although conventional real-time translations systems enable visualization of textual translations of an audio stream as the stream is being received, the textual translations often repeatedly change (which is referred to in this specification as "translation flicker" or simply as "flicker") as additional portions of the audio stream are received. This is illustrated in FIG. 1 where the first translated word in the first few translations changes multiple times before settling on the word "Establecer." Such translation flicker can happen because the ordering of words (e.g., the ordering of verbs and adjectives with respect to nouns) can vary between languages. Such translation flicker can also occur because, e.g., existing translation algorithms generally make arbitrary decisions between roughly equivalent words, phrases, and word ordering, and those decisions can change as the audio stream is continuously received.

SUMMARY

In general, one innovative aspect of the subject matter described in this specification can be embodied in methods that can include the operations of obtaining an audio data stream; determining a first language in which audio in the audio data stream is recorded; generating, at each time interval in a plurality of successive time intervals, a partial transcription of the audio, wherein each partial transcription (1) is a transcription of the audio from the beginning of the audio until a particular time interval and (2) is in the first language; for each partial transcription: translating the partial transcription into a second language that is different from the first language; inputting the translated partial transcription into a model, wherein the model determines whether a portion of an input translated partial transcription is stable, wherein a portion of an input translated partial transcription is stable when the portion of the input translated partial transcription is not expected to change in another translated partial transcription of audio recorded until a time interval that is later than the time interval for the input partial transcription; identifying, by the model and based on the input translated partial transcription, a portion of the translated partial transcription as stable; and in response to identifying the portion of the translated partial transcription as stable, providing, for display on a user device and using the identification, the portion of the translated partial transcription. Other embodiments of this aspect include corresponding systems, devices, apparatus, and computer programs configured to perform the actions of the methods. The computer programs (e.g., instructions) can be encoded on computer storage devices.

These and other embodiments can each optionally include one or more of the following features.

In some implementations, the model can be trained based upon translations of transcriptions generated from one or more training audio data files recorded in the first language.

In some implementations, the transcriptions generated from one or more training data audio files can include, for each training audio data file, a plurality of partial transcriptions of the audio data file, each partial transcription of a training audio data file being generated at a respective one of a plurality of successive time intervals, wherein each partial transcription (1) is a transcription of the audio from a beginning of the audio until a particular time interval and (2) is in the first language.

In some implementations, the model can be trained based upon stability values identifying a portion of a respective translated partial transcription of a respective one of one or more audio data files that is stable.

In some implementations, each stability value can be generated using positions of words in the respective translated partial transcription and other translated partial transcriptions for the respective one of the one or more audio data files.

In some implementations, methods can include training the model to identify sequences of words in partial transcriptions that are expected to be stable, wherein the training can include: obtaining training audio data files; identifying, from among the training audio data files, a plurality of training audio data files with audio recorded in the first language; for each training audio data file in the plurality of training audio data files: generating a partial transcription of the audio in the training audio data file at a plurality of successive time intervals, wherein each partial transcription (1) is a transcription of the audio from a beginning of the audio until a particular time interval and (2) is in the first language; and generating a chronological list of partial transcriptions that are ordered from earliest to latest relative to the beginning of the audio; and generating a chronological list of translated partial transcriptions corresponding to the chronological list of partial transcriptions, including: for each partial transcription in the chronological list of partial transcriptions, translating the partial transcription into the target language; for each translated partial transcription, beginning with a first translated partial transcription in the chronological list of translated partial transcriptions: generating, using positions of words in the translated partial transcription and other translated partial transcriptions, a stability value identifying a portion of the translated partial transcription that is stable; and training the model using the translated partial transcription as an input of the model and the stability value as an output of the translation stability model.

In some implementations, generating the stability value can include computing a correctness probability for each word in the translated partial transcription, wherein the correctness probability measures the probability that a word at a particular position of the translated partial transcription appears at the particular position in one or more other translated partial transcriptions that appear after the translated partial transcription in the chronological list of translated partial transcriptions; and generating the stability value for the translated partial transcription using the correctness probability for each word in the translated partial transcription.

In some implementations, computing the correctness probability for each word in the translated partial transcription, can include: for each word in the translated partial transcription: determining a particular position of the word in the translated partial transcription; computing a first value, wherein the first value is a number of partial translated transcriptions that are listed after the translated partial transcription in the chronological list of translated partial transcriptions; computing a second value, wherein the second value specifies a number of times that the word appears at the particular position in translated partial transcriptions appearing after the translated partial transcription in the chronological list of translated partial transcriptions; and dividing the second value by the first value to obtain the correctness probability of the word.

In some implementations, generating the stability value can include computing a change frequency metric for each word in the translated partial transcription, wherein the change frequency metric measures a number of times that a word at a particular position of the translated partial transcription changes at the particular position in translated partial transcriptions that are listed after the translated partial transcription in the chronological list of translated partial transcriptions; and generating the stability value for the translated partial transcription using the change frequency metric for each word in the translated partial transcription.

In some implementations, generating the stability value can include: computing an equal-to-last metric for each word in the partial transcription, wherein the equal-to-last metric identifies whether a position of a word in the partial transcription is the same as a position of the word in a partial transcription that appears last on the chronological list of translated partial transcriptions; and generating the stability value for the translated partial transcription using the equal-to-last metric for each word in the translated partial transcription.

Another innovative aspect of the subject matter described in this specification can be embodied in methods that can include the operations of obtaining an audio data stream; determining a first language in which audio in the audio data stream is recorded; generating a partial transcription of the audio at a plurality of successive time intervals, wherein each partial transcription (1) is a transcription of the audio from a beginning of the audio until a particular time interval and (2) is in the first language; for each successive particular partial transcription: translating the particular partial transcription into the target language; and for each word of the translated particular partial transcription, computing a stability value for the word by determining whether a position of the word in the translated particular partial transcription matches a position of the word in a threshold number of translated partial transcriptions within a set of translated partial transcriptions that precede the translated particular partial transcription; generating a stability value for the translated particular partial transcription using the computed stability values for the words in the translated particular partial transcription, wherein the stability value for the translated particular partial transcription identifies a portion of the particular translated partial transcription that is stable; and in response to generating the stability value, providing, for display on a user device, the portion of the translated particular partial transcription. Other embodiments of this aspect include corresponding systems, devices, apparatus, and computer programs configured to perform the actions of the methods. The computer programs (e.g., instructions) can be encoded on computer storage devices.

Particular embodiments of the subject matter described in this specification can be implemented to realize one or more of the following advantages. The innovations described in this specification reduce translation flicker that is generally encountered by conventional real-time translation systems when translating an audio stream in real-time. To achieve such reduced translation flicker, the techniques described in this specification only display those portions of the real-time translation that are determined to be stable (which, as further described in this specification, refers to translations that are not expected/predicted to change as additional portions of the audio stream are received and translated).

Moreover, the techniques described in this specification have faster processing times relative to conventional real-time translation systems that apply a certain delay before generating translations. In particular, such conventional systems wait a longer period of time to generate translated text than the present system. As such, while these delay-based conventional systems achieve higher accuracy and/or lower translation flicker than other conventional systems, that accuracy comes at the cost of longer delays, which may not be feasible in settings requiring faster real-time translation output. In contrast, the stability-based techniques described in this specification minimize the delay otherwise present in the delay-based conventional systems, but do so while providing a similar or perhaps even better stability/reduced translation flicker than such conventional systems.

In one implementation described further in this specification, a model (e.g., a supervised machine learning model) is used to predict the portion of a translated portion of an input audio stream that is stable, which in turn is used to determine the portion of the translation to display. Rather than train the model with already-translated text as may be done in conventional systems, the model training technique described herein uses actual audio files/streams that are transcribed and then translated. Using actual audio to curate the training data ensures that the model is more robust (than conventional systems) because it is trained using multiple different audio scenarios of people (or other entities) speaking or emitting sounds. Moreover, any errors in the translation, which may have been introduced during the translation (e.g., in generating an incorrect translation) and/or during the transcription of the audio (e.g., in incorrectly transcribing one or more words) are propagated during the model training. For example, transcription of audio files may use contextual information to continuously update the transcription as more audio data is received. By using audio to curate the training data the model can effectively integrate uncertainty in the transcription of the audio signal into the model. As a result, the model is trained using potentially-erroneous training data, which not only mimics how translation is performed in practice, but also ensures that the model is trained to accommodate for such system error in determining the stability of the translation.

Moreover, the model-based techniques described in this specification do not require any previously-labeled data for training, nor do they require significant resources to obtain or generate such labels. Instead, the techniques described in this specification utilize a set of simple rules that require limited computer processing in generating training labels for the obtained audio training data.

In another implementation described further in this specification, an algorithm is used to predict a stable portion of a particular translation based on whether one or more prior translations from an earlier time in the audio stream also included that portion of the translation in the same location(s) as in the particular translation. This technique is more resource efficient than model-based techniques because it requires less computing resources (e.g., processor and memory requirement) than required for training, building, and storing the model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 shows an example output of real-time translations generated by a conventional real-time translation system.

FIG. 4 shows an example list of translated partial transcriptions and the corresponding stability values for the translated partial transcription generated by the system of FIG. 2.

Like reference numbers and designations in the various drawings indicate like elements.

DETAILED DESCRIPTION

Figure 2:
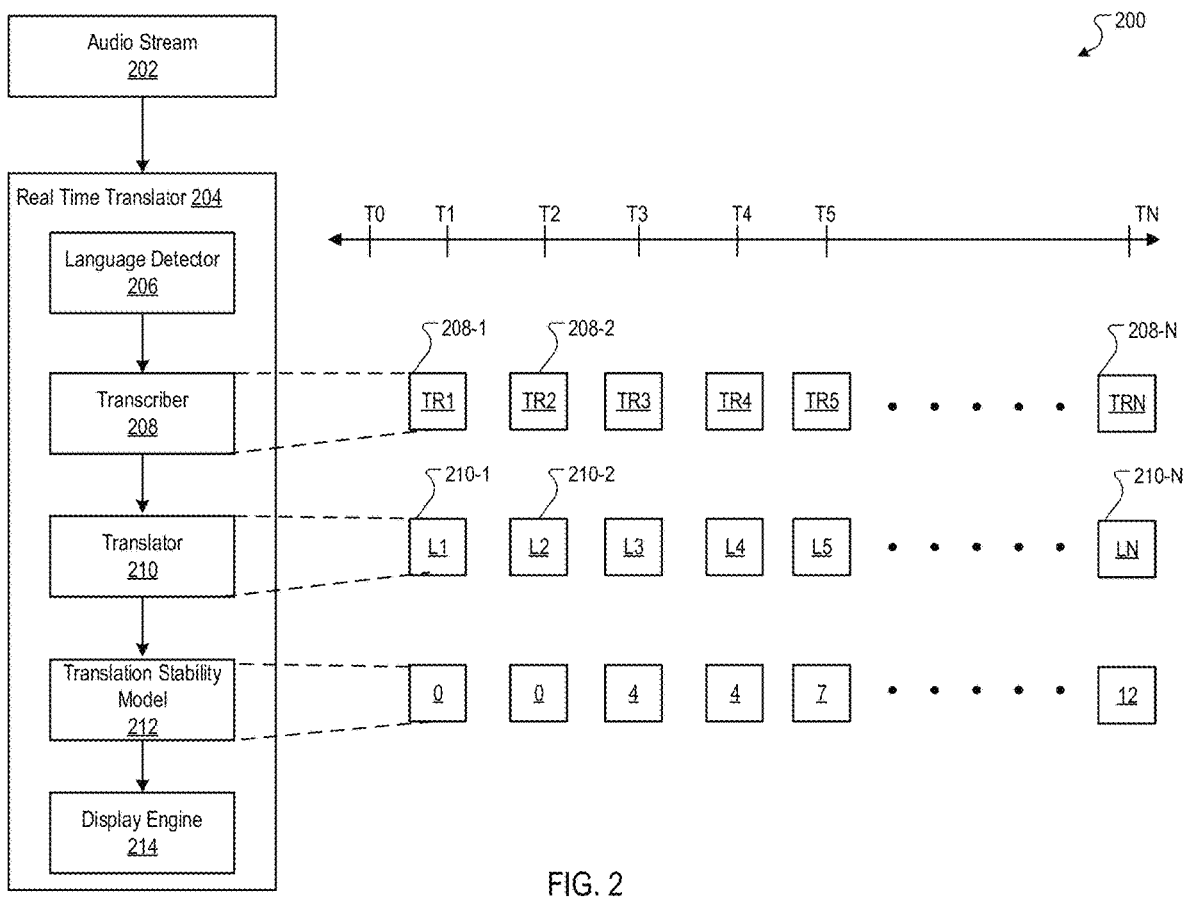
FIG. 2 is a block diagram of an example environment in which an input audio stream in a source language is textually translated in real-time into a target language.

This specification generally relates to generating stable real-time textual translations in a target language of an input audio data stream that is recorded in a source language.

As summarized below, and described in greater detail throughout this specification, a real-time translator receives an audio stream and generates stable real-time textual translations of the audio stream in a target language. As used in this specification, a stable real-time textual translation is a translation of a first portion of an audio stream (i.e., the beginning of the audio stream to a particular time interval) that is not expected/predicted to change when a real-time translation is generated for a later portion of the audio stream (i.e., a portion of the audio stream from the beginning of the stream to a time interval that occurs after the particular time interval).

Upon receiving the audio stream (or a portion of this stream), the real-time translator determines a first language (also referred to as the source language) in which the audio stream is recorded. The real-time translator generates partial transcriptions of the audio stream at multiple successive time intervals during the streaming of the audio. As used in this specification, a partial transcription (1) is a transcription of the audio from the beginning of the audio until a particular time interval and (2) is in the first language. Then, for each partial transcription, the real-time translator generates a textual translation of the partial transcription in a second language (also referred to in this specification as target language), which is different from the first language.

For each translated partial transcription, the real-time translator determines whether a portion of the translated partial transcription (which could include a part of the translated partial transcription or all of it) is stable—i.e., the translated partial transcription is not expected/predicted to change in another translated partial transcription of audio recorded until a time interval that is later than the time interval for the input partial transcription.

The real-time translator can make this stability determination in a few different ways. In some implementations, the real-time translator can use a model (e.g., a supervised or unsupervised machine learning model) that is trained to generate a stability value that identifies a stable portion of the input translated partial transcription. Such a model is trained using a set of translated partial transcriptions (generated from actual audio data files) and the corresponding stability value for the translated partial transcriptions. In other implementations, the real-time translator computes a stability value of the particular translated partial transcription by determining whether a position of each word in the particular translated partial transcription matches a position of that word in a threshold number of other translated partial transcriptions that precede the particular translated partial transcription. Each word in the transcription/translation can be generalized to tokens of other languages.

Using the generated stability value, which identifies the portion of the translated partial transcription that is identified as stable, the real-time translator provides for display only that portion of the translated partial transcription.

The above-described features as well as additional features of the real-time translator are further described below with reference to FIGS. 2-8.

FIG. 2 is a block diagram of an example environment 200 in which an input audio stream in a source language is textually translated in real-time into a target language.

The real-time translator 204 (shown in FIG. 2) generates real-time translations of an input audio stream 202. The input audio stream 202 can be received from multiple sources. For example, the audio stream 202 could be a voice recording or an audio file that is stored on a user device. As another example, the audio stream 202 could be obtained over a network from a server or a cloud service.

In some implementations, a user of a user device can send a request to the real-time translator 204 to generate real-time translations of the audio stream 202. Such a request can include the audio stream 202 or alternatively, can identify the location or source of the audio stream 202, which can be used by the real-time translator 204 to obtain the audio stream 202.

The real-time translator 204 is a data processing apparatus that includes multiple components: (1) a language detector 206; (2) a transcriber 208; (3) a translator 210; (4) a translation model 212; and (5) a display engine 214. Each of these components is also a data processing apparatus as described further in this specification. Although these components are shown as being part of the real-time translator 204, in alternative implementations, one or more of these components may be implemented separately. Moreover, while these are shown as separate components, one or more of these components can be combined into one component. For example, the transcriber 208 and the language detector 206 can be implemented as a single component. The structure and operation of each of these components is described with reference to FIG. 3.

In some implementations, the real-time translator 204 can be implemented as a single software package that resides locally at a user device. A user device typically includes a user application, such as a web browser, to facilitate the sending and receiving of data over the network 108, but native applications executed by the client device 102 can also facilitate the sending and receiving of content over the network 108. Alternatively, the real-time translator can be deployed in the cloud or on a server that is accessible by a user device over a network (such as a local area network (LAN), a wide area network (WAN), the Internet, or a combination thereof).

Figure 3:
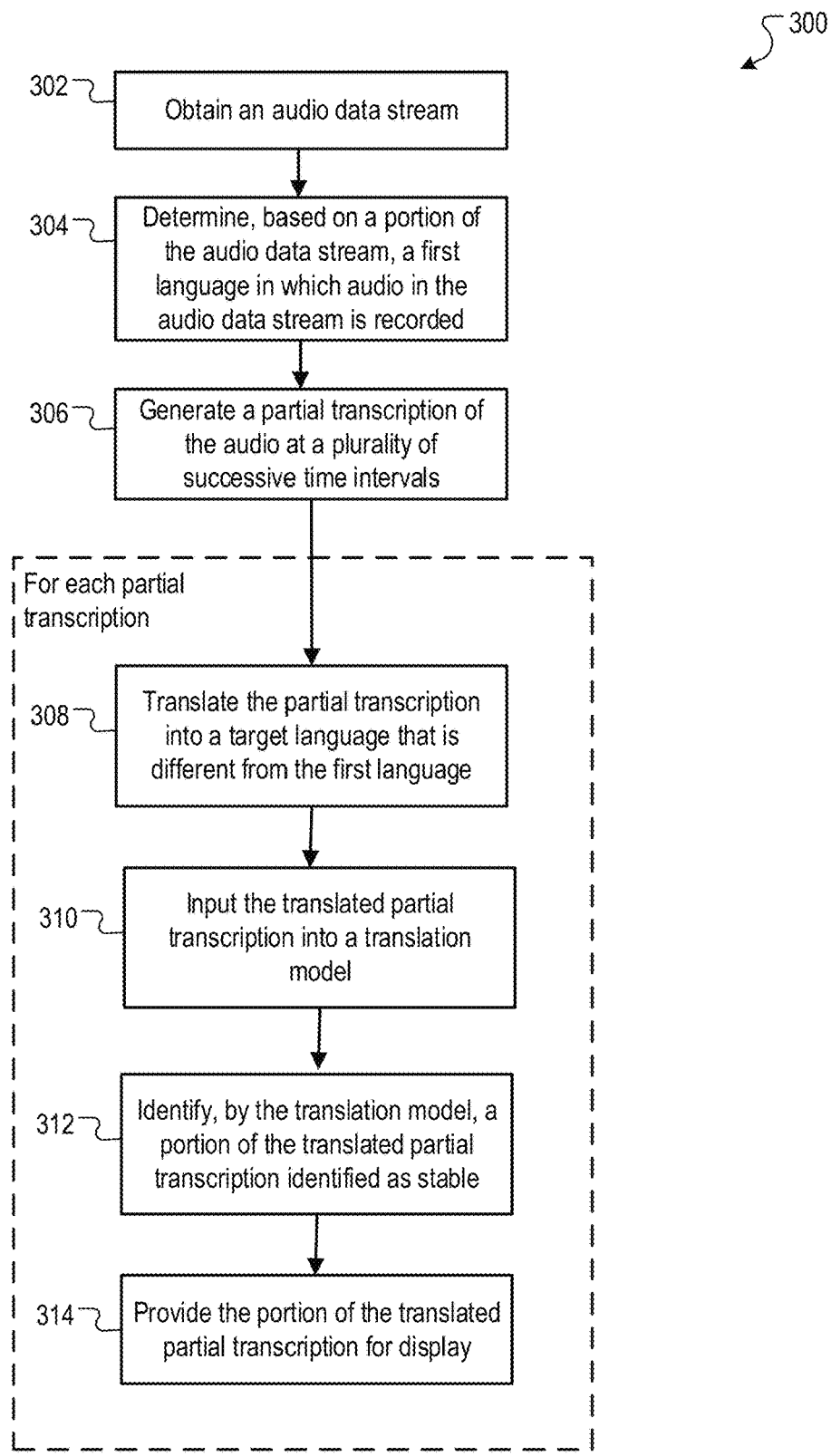
FIG. 3 is a flow diagram of an example process for generating real-time textual translations of an input audio stream, which is recorded in a source language, in a target language.

FIG. 3 is a flow diagram of an example process 300 for generating real-time textual translations of an input audio stream, which is recorded in a source language, in a target language. Operations of the process 300 are illustratively described below with reference to the real-time translator 204 of FIG. 2 (and the components thereof). Operations of the process 300 can be performed by any appropriate device or system, e.g., any appropriate data processing apparatus. Operations of the process 300 can also be implemented as instructions stored on a non-transitory computer readable medium. Execution of the instructions causes one or more data processing apparatus to perform operations of the process 300.

The real-time translator 204 obtains an audio data stream (at 302). As described with reference to FIG. 2, the input audio stream 202 could be received from multiple sources. For example, the audio stream 202 could be a voice recording or an audio file that is stored on a user device. As another example, the audio stream 202 could be obtained over a network from a server or a cloud service.

The language detector 206 determines a first language in which audio in the audio data stream is recorded (at 304). In some implementations, the language detector 206 parses the metadata included with the audio stream 202 to search for a tag identifying the first language in which the audio is recorded. Alternatively, such a language identifier may be included in a request by a user device to translate an input audio stream. If such a language-identifying tag is included in the audio stream 202 (or otherwise included in the request), the language detector 206 obtains the data associated with this tag that identifies the first language in which the audio is recorded. If the audio stream or file does not include such a language-identifying tag, the language detector 206 analyzes a certain portion of the input audio stream 202 (e.g., a portion corresponding to a certain time interval (e.g., 1-3 seconds) of the audio) to determine the source language in which audio corresponding to that portion is recorded. In some implementations, to accomplish this, the language detector 206 can compare the portion of the input audio stream or file to a repository of known signatures associated with different target languages. In some implementations, the language detector 206 can include a machine learning model such as a residual neural network (RNN) (or another appropriate statistical model) that identifies the language in which a certain snippet of audio is recorded and is trained using a set of audio snippets and a corresponding set of labels identifying the language in which each audio snippet is recorded.

The transcriber 208 generates a partial transcription of the audio at successive time intervals during the audio stream (at 306). In some implementations, the transcriber 208 is implemented using an automated speech recognition (ASR) algorithm or another appropriate audio-to-text transcription service. Unlike conventional ASR algorithms that wait until the entire audio stream is received before generating a complete transcription of the audio stream, the algorithms used to implement the transcriber 208 generate partial transcriptions of the audio at successive time intervals (which may be separated by fixed time, e.g., every 1-2 seconds, or a variable time) of the audio stream or playback. As used in this specification, a partial transcription of the audio (1) is a transcription of the audio from the beginning of the audio until a particular time interval in the audio and (2) is in the first language, which is the language in which the audio is recorded. In other words, at each successive time interval, the transcriber 208 generates a partial transcription of the audio from the beginning of the audio to the end of that particular successive time interval.

As shown in FIG. 2, the transcriber 208 generates partial transcriptions of the audio (TR1 208-1 to TRN 208-N) in the audio stream 202 at each time interval (T1 to TN) shown on the timeline. As such, the transcriber 208 generates a partial transcription TR1 208-1 for time T1, which is a transcription of the audio from the beginning of the audio (time T0) until time T1. Similarly, the transcriber 208 generates a partial transcription TR2 208-2 for time T2, which is a transcription of the audio from the beginning of the audio (time T0) until time T2. As another example, the transcriber 208 generates a partial transcription TRN 208-N for time TN, which is a transcription of the audio from the beginning of the audio (time T0) until time TN.

The following operations (operations 308, 310, 312, and 314) are performed iteratively for each partial transcription. In some implementations, these operations are performed beginning with the first partial transcription (TR1) and continuing with each subsequent, successive partial transcription (TR2, TR3 . . . TRN).

The translator 210 translates the partial transcription into a second language that is different from the first language (at 308). The translator 210 can be implemented using a conventional machine translation service that translates text in a source language (i.e., the first language) into a target language (i.e., a second language). In some implementations, the translator 210 accepts as input each partial transcription (generated by the transcriber 208) that is in the first/source language. For each such partial transcription, the translator 210 generates a textual translation of the partial transcription in the target language. As shown in FIG. 2, the translator 210 uses the partial transcriptions (TR1 208-1 to TRN 208-N) to generate corresponding translated partial transcriptions (L1 210-1 to LN 210-N).

The real-time translator 204 inputs the translated partial transcription (generated at operation 308) into the translation stability model 212 (at 310). The translation stability model 212 accepts as input a translated partial transcription and outputs a stability value that identifies a portion of the input translated partial transcription that is stable—i.e., a portion of the input translated partial transcription that is not expected/predicted to change in a subsequent translated partial (or complete) transcription (i.e., another translated transcription for a time interval that is later than the time interval for the input translated partial transcription). In some implementations, the stability value output by the translation stability model 212 indicates the number of words in the translated partial transcription that are stable. For example, for a translated partial transcription that includes 10 words, a stability value of 5 indicates that the first five words of the translated partial transcription are stable.

In some implementations, the translation stability model 212 can be implemented as a machine learning model, such as an RNN (e.g., a supervised or unsupervised model). Alternatively, the translation stability model 212 can be implemented as a rules-based engine or another appropriate statistical model. When the translation stability model 212 is implemented as a supervised machine learning model (e.g., a recurrent neural network), it can be trained using a set of translated partial transcriptions and a corresponding set of stability values for the translated partial transcriptions. Additional details regarding the training of the translation stability model 212 are described with reference to FIGS. 5 and 6.

In response to the translated partial transcription input into the translation stability model 212 at operation 308, the translation stability model 212 identifies (and the real-time translator 202 obtains from the model 212) a stability value, which identifies the portion of the translated partial transcription that is expected/predicted to be stable (at 312). This is further illustrated in FIG. 2. For example, FIG. 2 shows that the translation stability model 212 outputs a stability value of 0 for the first two translated partial transcriptions (L1 210-1 and L2 210-2) and outputs a stability value of 4 for the third and fourth translated partial transcriptions (L3 210-3 and L4 210-4).

In response to the identification of the portion of the translated partial transcription that is expected/predicted to be stable, the real-time translator 204 provides the portion of the translated partial transcription for display (at 314). In some implementations, the translation stability model 212 outputs the stability value and provides this value as well as the corresponding translated partial transcription to the display engine 214. The display engine 214 uses the translated partial transcription and the corresponding stability value to provide for display only the portion of the translated partial transcription that the stability value identifies as stable. For example, if (1) a translated partial transcription includes 10 words and (2) the stability value is 5, which indicates that the first five words of the translated partial transcription are expected to be stable, the display engine 214 only provide for display the first five words of the translated partial transcription. For example, and as shown in FIG. 2, the fourth translated partial transcription L4 has a stability value of 4 and thus, the display engine 214 would only provide the first four words of this translated partial transcription. This is further illustrated with reference to FIG. 4.

Operations 308-314 continue until the real-time translator 204 transcribes and translates the entire audio stream 202, and provides the expected stable portions of the translations for display. In this manner, the real-time translator 204 uses stability values in generating real-time textual translations (in a second/target language) of an input audio stream that is recorded in a first/source language.

Figure 4:
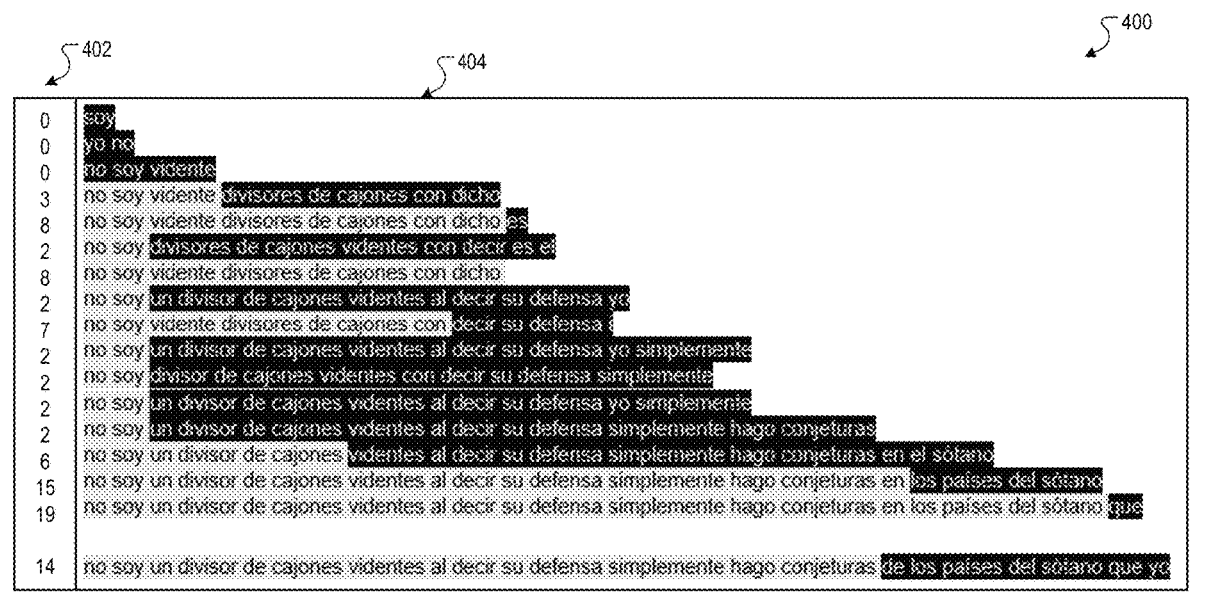

FIG. 4 shows an example list of translated partial transcriptions and the corresponding stability values for the translated partial transcription generated by the real-time translator of FIG. 2.

Reference 404 shows the translated partial transcriptions and reference 402 shows the stability value for each of the translated partial transcriptions. Although the translated partial transcriptions are in Spanish, partial transcriptions and their translation may be in other languages (in other words, the techniques described in this specification applies to translation between multiple pairs of languages). Black highlighting with white text represents text that is determined by the translation stability model 212 to be unstable and thus, is not provided for display (or is hidden). On the other hand, black text with no highlighting represents text that is determined by the translation stability model 212 to be stable and is thus provided for display.

In the following paragraphs, the first five translated partial transcriptions and their corresponding stability values (as shown in FIG. 4) are used as examples to describe what is provided for display by the display engine 214.

The first three translated partial transcriptions shown in FIG. 4 ("soy," "yo no," and "no soy vidente") have a stability value of 0, which indicates that none of the words in these translated partial transcriptions are expected to be stable. Thus, for these translated partial transcriptions, the display engine 214 does not provide for display any of the words of the translated partial transcriptions.

The fourth translated partial transcription ("no soy vidente divisores de cajones con dicho") has a stability value of 3, which indicates that the first three words of this translated partial transcription are expected to be stable. Accordingly, the display engine 214 provides for display the first three words ("no soy vidente") of this translated partial transcription.

The fifth partial transcription ("no soy vidente divisors de cajones con dicho es") has a stability value of 8, which indicates that the first eight words in this translated partial transcription are expected to be stable. Accordingly, the display engine 214 provides for display the first eight words ("no soy vidente divisors de cajones con dicho") of this translated partial transcription.

Figure 5:
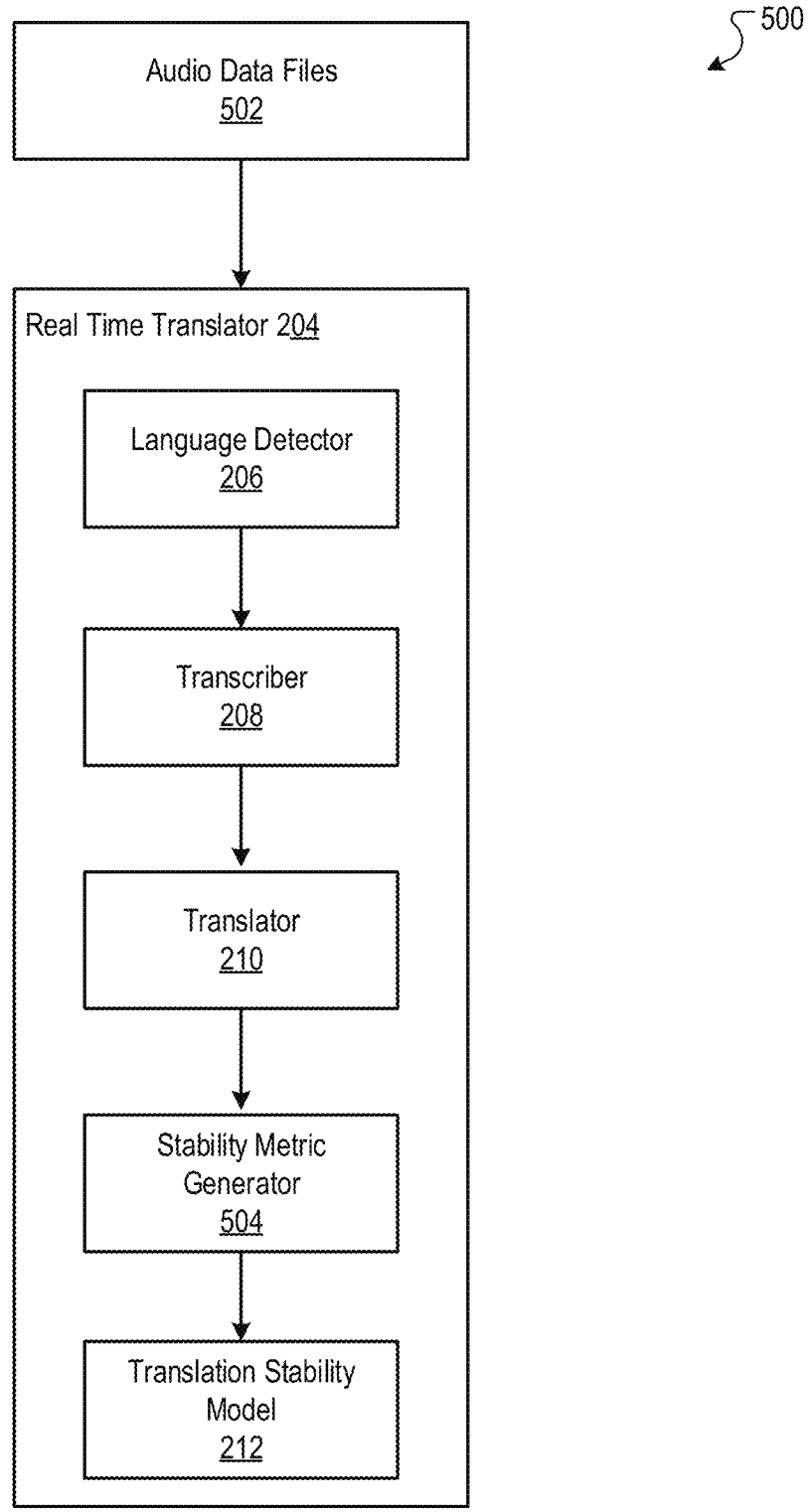
FIG. 5 is a block diagram of an example environment for training the translation stability model, which is described with reference to FIGS. 2, 3, and 4.

FIG. 5 is a block diagram of an example environment 500 for training the translation stability model 212, which is described with reference to FIGS. 2, 3, and 4.

The environment 500 is used to train the translation stability model 212, which can be implemented, e.g., as a supervised machine learning model, to generate a stability value for an input translated partial transcription obtained from an audio stream. All the components (and their associated structure and the operations performed by these components) of the real-time translator 204 shown in FIG. 5, with the exception of the stability metric generator 504, are the same as the identically-named components of the real-time translator 204 described with reference to FIGS. 2-4.

In some implementations, any audio utterance can be used in curating the audio training data that is used in the training of the translation stability model. Curating a diverse set of audio training data ensures that the model is trained using multiple different audio scenarios of people (or other entities) speaking or emitting sounds.

Moreover, an actual (i.e., verified for correctness) translated partial transcription is generally not used in the training; rather, the translation stability model is preferably trained using the translator 210—generated translated partial transcription, which in turn is generated from the transcriber 208—generated partial transcription. The generated, translated partial transcription can have errors, which may have been introduced by the translator 210 (e.g., generating an incorrect translation) and/or the transcriber 208 (e.g., incorrectly transcribing one or more words). As such, training the translation stability model 212 on such potentially-erroneous training data ensures that the model is trained to accommodate for such system error in determining the stability values.

As described in greater detail below, the translation stability model 212 is trained using a set of training labeled data, which includes a set of translated partial transcriptions in the target/second language and a corresponding set of labels identifying the stability value for each translated partial transcription. The translation stability model is trained to reduce a loss (specified by a loss function (e.g., L1, L2 loss)) of the model 212. Because stability values generally do not already exist for translated partial transcriptions corresponding to the training audio files, a stability metric generator 504 is used to generate the stability values for these translated partial transcriptions (as further described below with reference to FIG. 6), which are then used as labels during the training.

In some implementations, the stability metric generator 502 is a rules-based engine (i.e., a type of data processing apparatus) that includes a set of rules used in generating stability values for translated partial transcriptions obtained from the training audio data files. Additional details regarding the stability metric generator 504 and the training of the translation stability model 212 are described below with reference to FIG. 6.

Figure 6:
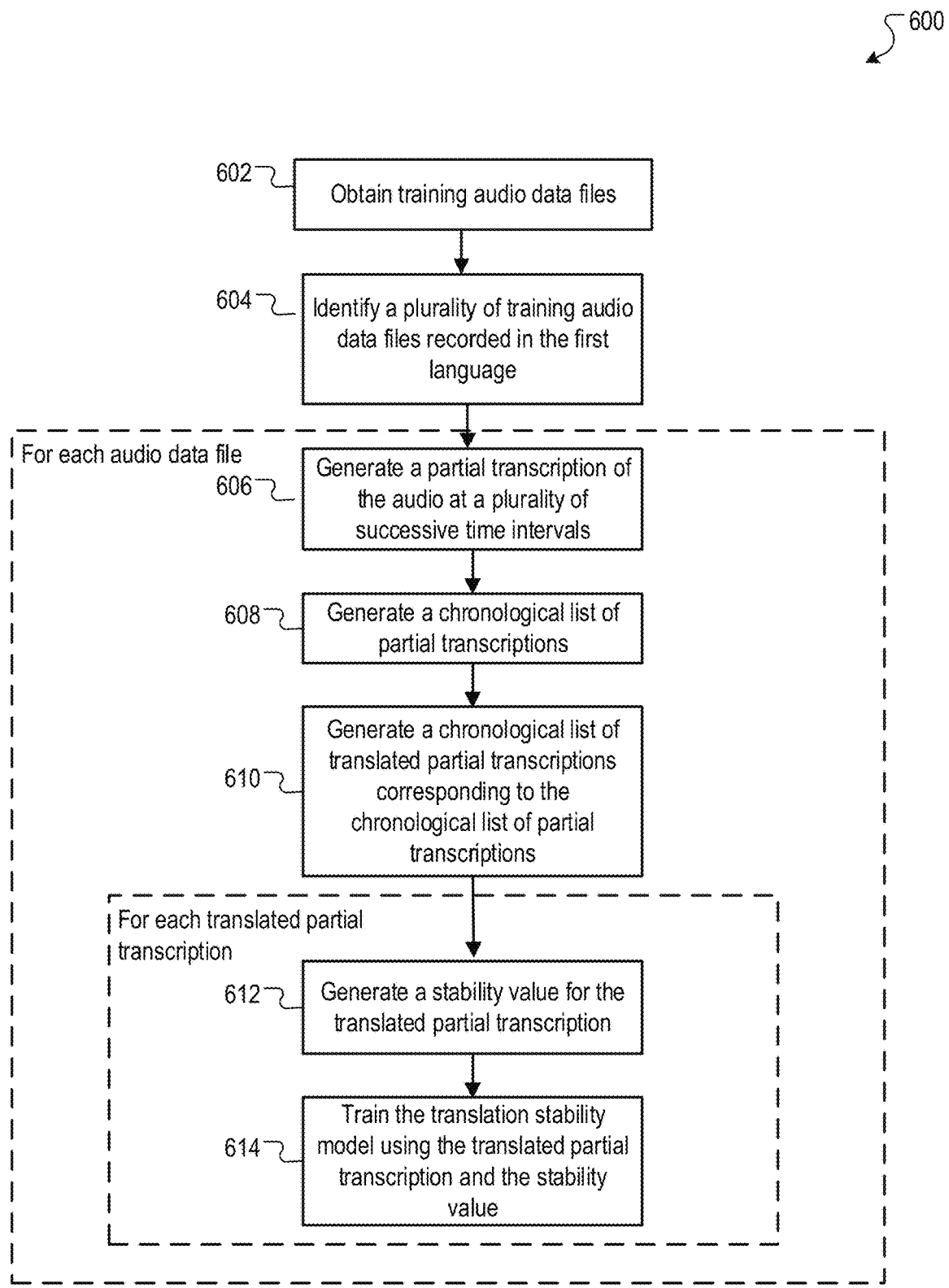
FIG. 6 is a flow diagram of an example process for training the translation stability model, which is described with reference to FIGS. 2, 3, 4, and 5.

FIG. 6 is a flow diagram of an example process 600 for training the translation stability model 212, which is described with reference to FIGS. 2-5. Operations of the process 600 are illustratively described below with reference to the real-time translator 204 of FIG. 5. Operations of the process 600 can be performed by any appropriate device or system, e.g., any appropriate data processing apparatus. Operations of the process 600 can also be implemented as instructions stored on a non-transitory computer readable medium. Execution of the instructions causes one or more data processing apparatus to perform operations of the process 600.

The real-time translator 204 obtains training audio data files (at 602). As described above, the real-time translator 204 can obtain training audio data files from any source that stores recorded audio. Examples of such sources are described with reference to FIG. 3.

The real-time translator 204 identifies, from among the training audio data files, a plurality of training audio data files with audio recorded in the first language (at 604). The language detector 206 determines the language in which each of the training audio data files is recorded (in the same manner as described with reference to FIG. 2 and above) and only identifies a plurality of training audio data files that the language detector determines to be recorded in the first language (source language).

The following operations (operations 606 to 614) are performed for each training audio data in the plurality of training audio data files.

The transcriber 208 generates a partial transcription of the audio in the training audio data file at a plurality of successive time intervals (at 606). This operation is performed in substantively the same manner as described with reference to the corresponding operation (operation 306) in FIG. 3. In some implementations, the transcriber 208 also assigns an audio order identifier to each partial transcription that can be used in determining a relative ordering of the partial transcriptions. In some implementations, the audio order identifier identifies the total time of the audio corresponding to the partial transcription. For example, assume that the partial transcriptions are generated for every two seconds of audio in the audio data file. In this example, the first partial transcription for the first two seconds of audio can be assigned an audio order identifier of 2, the second partial transcription for the next two seconds of audio can be assigned an audio order identifier of 4 (i.e., representing total time of 4 seconds elapsed from beginning of audio), the third partial transcription for the next two seconds of audio can be assigned an audio order identifier of 6 (i.e., representing total time of 6 seconds elapsed from beginning of audio), and so on.

The transcriber 208 generates a chronological list of the partial transcriptions (at 608). In some implementations, the transcriber 208 orders the partial transcriptions (generated at operation 606) from earliest to latest relative to the beginning of the audio. In some implementations, the transcriber 208 uses the audio order identifier in generating the chronological list of the partial transcriptions. In such implementations, the transcriber 208 generates a list of audio order identifiers and their corresponding partial transcriptions, and sorts this list in increasing order of audio order identifiers (assuming that audio order identifier for one partial transcription is greater than the audio order identifier for a preceding partial transcription). The resulting list of partial transcriptions is thus listed in chronological order with reference to the beginning of the audio.

The translator 210 generates a chronological list of translated partial transcriptions corresponding to the chronological list of partial transcriptions (at 610). In some implementations, for each partial transcription in the chronological list of partial transcriptions, the translator translates the partial transcription into the target language to obtain a translated partial transcription. This operation is performed in substantively the same manner as operation 308, which is described with reference to FIG. 3.

The following operations (operations 612 and 614) are performed for each translated partial transcription, beginning with the first translated partial transcription in the chronological list of translated partial transcriptions and then continuing with each successive translated partial transcription in that chronological list.

The stability metric generator 504 generates a stability value for the translated partial transcription, which identifies the portion of the translated partial transcription that is stable (at 612). The stability value can be computed in different ways, each of which may require using positions of words in the translated partial transcription and/or the other translated partial transcriptions in the chronological list of translated partial transcriptions. A few of the different techniques for computing the stability value are described below.

One technique for calculating the stability value is based on a computation of a correctness probability for each word in the translated partial transcription. The correctness probability measures the probability that a word at a particular position of the translated partial transcription appears at that same position in one or more subsequent translated partial transcriptions (i.e., one or more translated partial transcriptions that appear after the translated partial transcription in the chronological list of translated partial transcriptions).

To compute this correctness probability for a word in the translated partial transcription, the stability metric generator 504 first determines a position (also referred to as a first position or a particular position) of that word relative to the beginning (or the first word) of the translated partial transcription. In some implementations, the stability metric generator 504 counts the number of words from the first word in the translated partial transcription until the particular word. The stability metric generator 504 then computes a first value and a second value. The stability metric computes the first value by determining the number of partial translated transcriptions that are listed after the translated partial transcription in the chronological list of translated partial transcriptions. The stability metric generator 504 computes the second value by determining a number of times that the particular word appears at the first position in subsequent translated partial transcriptions—i.e., in translated partial transcriptions appearing after the translated partial transcription in the chronological list of translated partial transcriptions. The stability metric computes the correctness probability for each word by dividing the second value by the first value.

The stability metrics generator 504 uses the resulting correctness probability values for each word in the translated partial transcription to compute the stability value for the translated partial transcription. In some implementations, the stability metric generator 504 uses the correctness probability values for each word in the translated partial transcription to generate an array. The locations/positions of such an array corresponds to the positions at which the words in the translated partial transcription appear and the data stored at these array positions corresponds to the correctness probability values for those words. For example, array position 1 may correspond to the first word in the translated partial transcription and includes the correctness probability for the first word, array position 2 may correspond to the second word in the translated partial transcription and includes the correctness probability for the second word, and so on.

In some implementations, if the correctness probability for a word satisfies (e.g., meets or exceeds) a threshold value, that word may be identified in the array as stable (e.g., by assigning a label to the word of 1). On the other hand, if the correctness probability for a word does not satisfy the threshold value, that word may be identified in the array as unstable (e.g., by replacing the correctness probability with a 0).

The stability metrics generator 504 then determines a stability value for the translated partial transcription by counting the number of stable words in the translated partial transcription until the first unstable word is identified. In some implementations, this includes, beginning with the first position in the array and counting the number of "1"s (or another value that represents a stable word) until the first "0" (or another value that represents an unstable word) is encountered.

Another technique for calculating the stability value is based on a computation of a change frequency metric, which measures a number of times that a word at a particular position of the translated partial transcription does not appear at the particular position in translated partial transcriptions that are listed after the translated partial transcription in the chronological list of translated partial transcriptions.

To compute this change frequency value for a word in the translated partial transcription, the stability metric generator 504 first determines a position (also referred to as a first position or a particular position) of that word relative to the beginning (or the first word) of the translated partial transcription (as described above with reference to the correctness probability metric). The stability metric generator 504 then computes a first value and a second value. The stability metric computes the first value by determining the number of partial translated transcriptions that are listed after the translated partial transcription in the chronological list of translated partial transcriptions. The stability metric generator 504 computes the second value by determining a number of times that the word at the particular position changes in subsequent translated partial transcriptions—i.e., translated partial transcriptions appearing after the translated partial transcription in the chronological list of translated partial transcriptions. The stability metric computes the change frequency for each word by dividing the second value by the first value.

The stability metrics generator 504 uses the resulting change frequency values for each word in the translated partial transcription to compute the stability value for the translated partial transcription. In some implementations, the stability metric generator 504 uses the change frequency values for the words in the translated partial transcription to generate an array. The locations/positions of such an array corresponds to the positions at which the words in the translated partial transcription appear and the data stored at these array positions corresponds to the change frequency values for those words. For example, array position 1 may correspond to the first word in the translated partial transcription and includes the change frequency for the first word, array position 2 may correspond to the second word in the translated partial transcription and includes the change frequency for the second word, and so on. In some implementations, if the change frequency value for a word satisfies (e.g., is at or below) a threshold value, that word may be identified in the array as stable (e.g., by assigning a label to the word of 1). On the other hand, if the change frequency value for a word does not satisfy the threshold value, that word may be identified in the array as unstable (e.g., by assigning a label to the word of 0).

The stability metrics generator 504 then determines a stability value for the translated partial transcription by counting the number of stable words in the translated partial transcription until the first unstable word is identified. In some implementations, this includes, beginning with the first position in the array and counting the number of "1"s (or another value that represents a stable word) until the first "0" (or another value that represents an unstable word) is encountered.

Another technique for calculating the stability value is based on an equal-to-last metric, which identifies whether a position of a word in the translated partial transcription is the same as a position of the word in the last translated partial transcription in the chronological list of translated partial transcriptions.

To compute this equal-to-last metric for a word in the translated partial transcription, the stability metric generator 504 first determines a position (also referred to as a first position or particular position) of that word relative to the beginning (or the first word) of the translated partial transcription (as described above with reference to the correctness probability metric). The stability metric generator 504 then computes a first value (also referred to as the equal-to-last value for the word) by determining whether the particular word appears at the first/particular position in the "last" translated partial transcription—i.e., a translated partial transcription that appears at the end of the chronological list of translated partial transcriptions. The first value for a word indicates whether the word is stable or not. In some implementations, if the stability metric generator 504 determines that the particular word appears at the first position in the "last" translated partial transcriptions, it assigns a "1" (or another value indicating a stable word) to the first value; otherwise, it assigns a "0" (or another value indicating an unstable word) to the first value.

The stability metrics generator 504 uses the equal-to-last values for each word in the translated partial transcription to compute the stability value for the translated partial transcription. In some implementations, the stability metric generator 504 uses the equal-to-last values for the words in the translated partial transcription to generate an array. The locations/positions of such an array correspond to the positions at which the words in the translated partial transcription appear and the data stored at these array positions corresponds to the equal-to-last values for those words. For example, array position 1 may correspond to the first word in the translated partial transcription and includes the equal-to-last value for the first word, array position 2 may correspond to the second word in the translated partial transcription and includes the equal-to-last value for the second word, and so on.

The stability metrics generator 504 then determines a stability value for the translated partial transcription by counting the number of stable words in the translated partial transcription until the first unstable word is identified. As noted above, in some implementations, an equal-to-last value of 1 indicates a stable word, while an equal-to-last value of 0 indicates an unstable word. In such implementations, the stability value for the translated partial transcription is determined by, beginning with the first position in the array and counting the number of "1"s until the first "0" (or another value that represents an unstable word) is encountered.

In some implementations, only one of the above-identified techniques for calculating the stability value for the translated partial transcription may be used by the stability metric generator 504. In other implementations, two or more of these techniques may be used in computing the stability value, in which case, the stability metric generator 504 computes the stability value for the translated partial transcription using each of these techniques and then selects one of the stability values (e.g., the lowest stability value or the highest stability value) as the final stability value to use in training of the translation stability model 212.

Returning to the process 600, the real-time translator 204 trains the translation stability model 212 using the translated partial transcription and the stability value determined at operation 612 (at 614). In some implementations, the training continues until all translated partial transcriptions of each of the training audio data files is completed. Alternatively, the training continues until the loss of the translation stability model 212 satisfies (e.g., is at or below) a particular threshold.

Once trained using the process 600, the translation stability model 212 can be used in an inference mode to identify stability values of input translated partial transcriptions, which in turn can be used in determining the expectedly/predicted stable translated words to display during real-time translations of the received audio stream (as described with reference to FIGS. 2-4).

Figure 7:
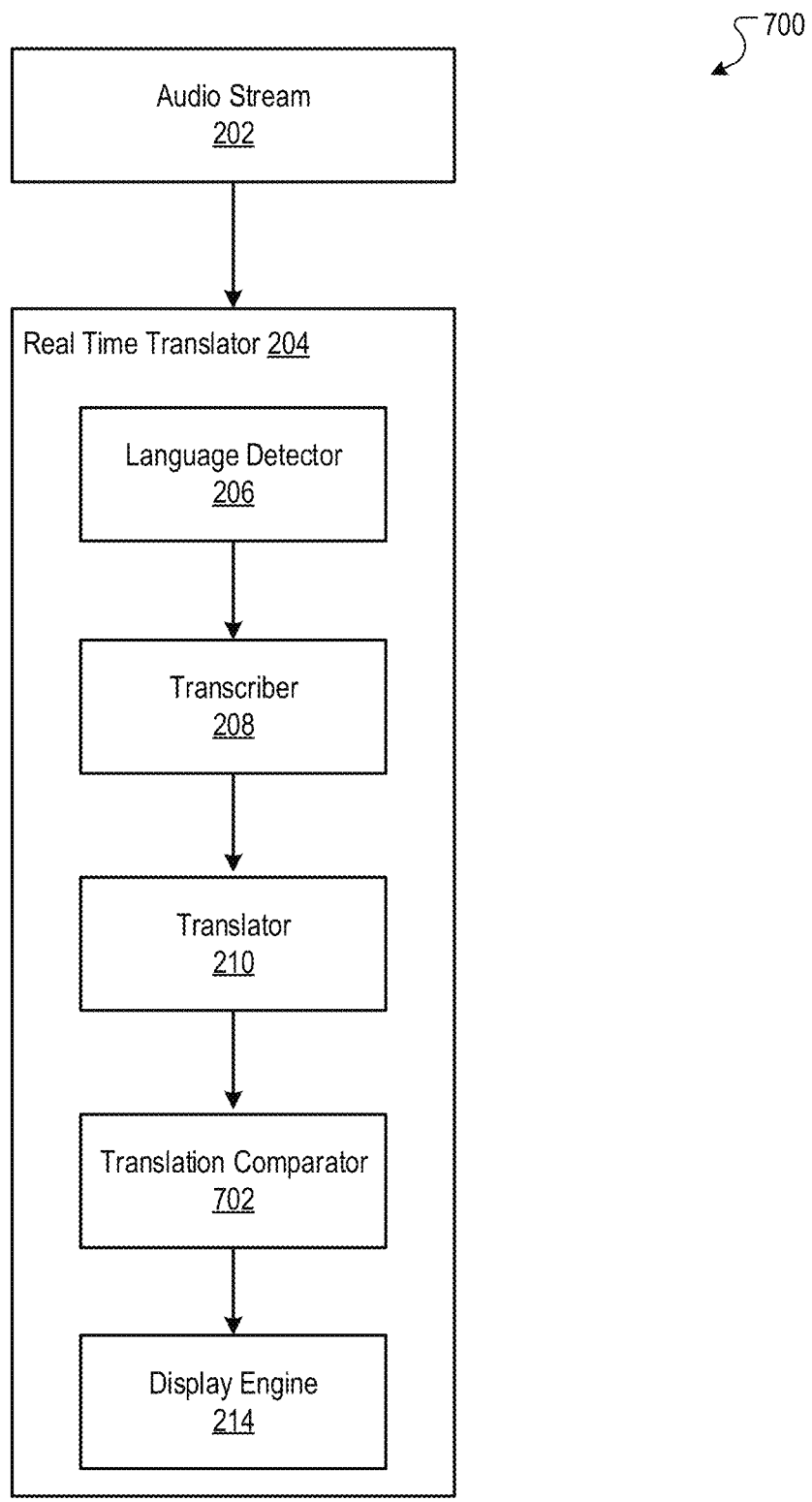
FIG. 7 is a block diagram of an example environment in which an input audio stream in a source language is textually translated in real-time into a target language.

FIG. 7 is a block diagram of an example environment 700 in which an input audio stream in a source language is textually translated in real-time into a target language.

Much like the example environments described with reference to FIGS. 2-4, the example environment 700 provides a system that generates stable real-time textual translations of an input audio stream using computed stability values. Indeed, all the components (and their associated structure and the operations performed by these components—as described with reference to FIG. 3) of the real-time translator 204 shown in FIG. 2, with the exception of the translation stability model 212, are the same as the identically-named components of the real-time translator 204 shown in FIG. 7. However, instead of the translation stability model 212 shown in FIG. 2, the real-time translator 204 of FIG. 7 includes a translator comparator 702. Although both the translation stability model 212 and the translator comparator 702 generate a stability value for a translated partial transcription, the translator comparator 702 generates the stability value for the translated partial transcription in a different manner (as further described below).

To compute the stability value for the translated partial transcription, the translator comparator 702 first computes the stability value of the words in the translated partial transcription. It does so by using the words appearing in one or more preceding translated partial transcriptions (i.e., one or more translated partial transcriptions corresponding to portions of the audio stream ending at earlier time intervals). In some implementations, the translator comparator 702 identifies the positions of words in a translated partial transcription. Thus, for each word, the translator comparator 702 computes a first position value representing the position of the word in the translated partial transcription (similar to the description of determining positions of words that is provided above with reference to FIG. 6).

Then, for each word in the translated partial transcription, the translator comparator 702 determines a stability value for the word by determining whether that word appears in the first position in a threshold number (which can be any predetermined number that is greater than or equal to one) of preceding translated partial transcriptions. In other words, the translator comparator 702 determines whether a position of the word in the translated partial transcription matches a position of the word in a threshold number of translated partial transcriptions within a set of translated partial transcriptions that precede the translated particular partial transcription. If the translator comparator 702 determines that a word appears in the first position in a threshold number of preceding translated partial transcriptions, it assigns a "1" (or another value indicating a stable word) to that word; otherwise, it assigns a "0" (or another value indicating an unstable word) to that word.

The translator comparator 702 uses the stability value for each word in the translated partial transcription to compute the stability value for the translated partial transcription. In some implementations, the translator comparator 702 uses the stability values for the words in the translated partial transcription to generate an array. The locations/positions of such an array correspond to the positions at which the words in the translated partial transcription appear and the data stored at these array positions identifies the stability values for those words. For example, array position 1 may correspond to the first word in the translated partial transcription and includes the stability value for the first word, array position 2 may correspond to the second word in the translated partial transcription and includes the stability value for the second word, and so on.

The translation comparator 702 then determines a stability value for the translated partial transcription by counting the number of stable words in the translated partial transcription until the first unstable word is identified. This is determined by, beginning with the first position in the array and counting the number of "1"s (or another appropriate value that represents a stable word) until the first "0" (or another value that represents an unstable word) is encountered.

Using the computed stability value for the translated partial transcription, the real-time translator 204 provides a portion of the translated partial transcription for display. In some implementations, the translator comparator 702 outputs the stability value and provides this value as well as the corresponding translated partial transcription to the display engine 214. The display engine 214 uses the translated partial transcription and the corresponding stability value to provide for display only the portion of the translated partial transcription that the stability value identifies as expected/predicted to be stable. For example, if (1) a translated partial transcription includes 10 words and (2) the stability value is 5, which indicates that the first five words of the translated partial transcription are stable, the display engine 214 only provides for display the first five words of the translated partial transcription.

As such, the technique for computing the stability value described with reference to FIG. 7 is different from the translation stability model 212 building approach described with reference to FIG. 2-6. In general, the translation stability model 212 builds stability predictions by comparing current sequences with future partial results with the goal of deviating from the future results as little as possible. In contrast, the algorithm described with reference to FIG. 7 uses past translated partial transcriptions with the goal of deviating from the past as little as possible. Moreover, because the algorithm described with reference to FIG. 7 does not require any model training and development, it is more computing resource efficient than the model-based techniques described with reference to FIGS. 2-6.

Figure 8:
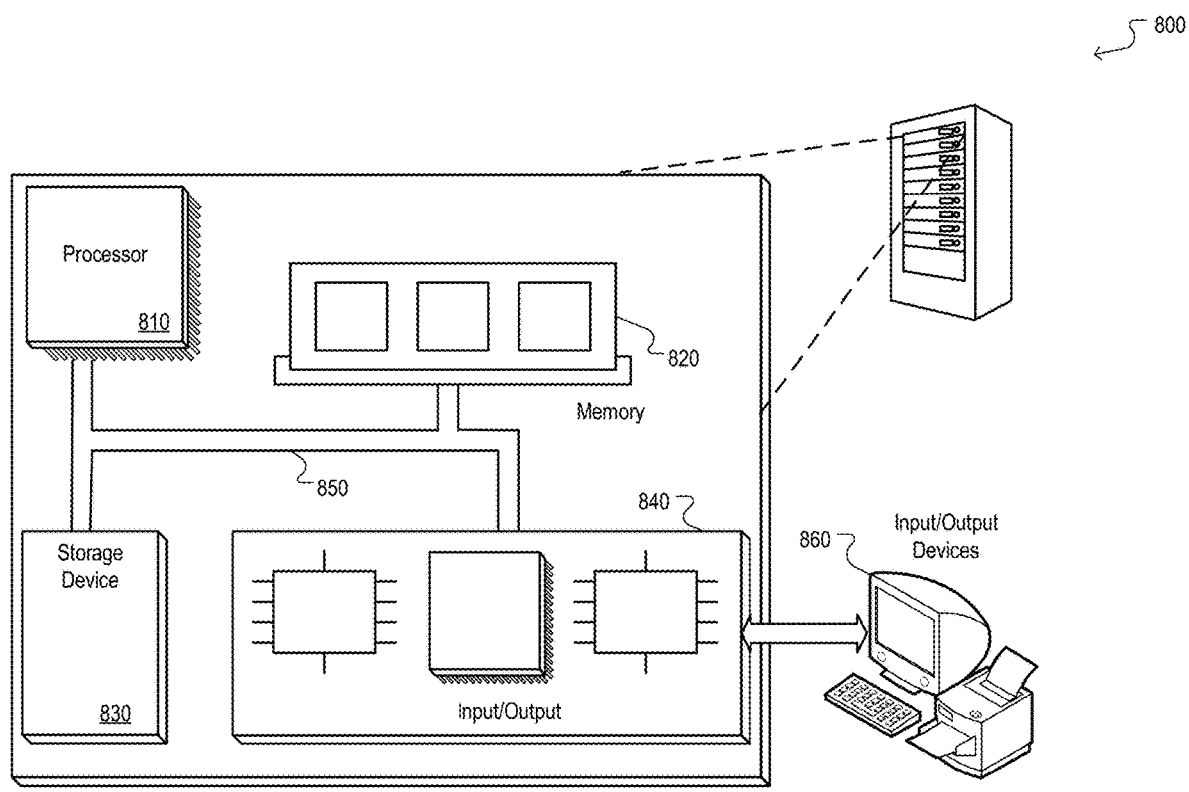
FIG. 8 is a block diagram of an example computer system.

FIG. 8 is block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In some implementations, the processor 810 is a single-threaded processor. In another implementation, the processor 810 is a multi-threaded processor. The processor 810 is capable of processing instructions stored in the memory 820 or on the storage device 830.

The memory 820 stores information within the system 400. In one implementation, the memory 820 is a computer-readable medium. In some implementations, the memory 820 is a volatile memory unit. In another implementation, the memory 820 is a non-volatile memory unit.

The storage device 830 is capable of providing mass storage for the system 800. In some implementations, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 400. In some implementations, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining an audio data stream;
   determining a first language in which audio in the audio data stream is recorded;

generating, at each time interval in a plurality of successive time intervals, a partial transcription of the audio, wherein each partial transcription (1) is a transcription of the audio from a beginning of the audio until a particular time interval and (2) is in the first language; and for each partial transcription:
  translating the partial transcription into a second language that is different from the first language;
  inputting the translated partial transcription into a machine learning model, wherein the machine learning model is configured to predict whether a portion of an input translated partial transcription is stable, the machine learning model is trained to minimize a loss function and is trained using a set of translations of transcriptions generated from one or more training audio data files recorded in the first language and a corresponding set of stability values that each indicate whether a respective set translation is stable, wherein the set of stability values are generated using a set of rules;
  generating, using the machine learning model, a prediction indicating that a portion of the translated partial transcription is stable, wherein a portion of an input translated partial transcription is stable when the portion of the input translated partial transcription is not expected to change in another translated partial transcription of audio recorded until a time interval that is later than the time interval for the input partial transcription; and
  in response to generating the prediction indicating that the portion of the translated partial transcription as stable, providing, for display on a user device and using the prediction, the portion of the translated partial transcription.

2. The computer-implemented method of claim 1, wherein the transcriptions generated from one or more training data audio files comprises, for each training audio data file, a plurality of partial transcriptions of the training audio data file, each partial transcription of a training audio data file being generated at a respective one of a plurality of successive time intervals, wherein each partial transcription (1) is a transcription of the audio from a beginning of the audio until a particular time interval and (2) is in the first language.

3. The computer-implemented method of claim 2, wherein a stability value for a training audio data file from the one or more training audio data files is generated using positions of words in the respective translated partial transcription and other translated partial transcriptions for the training audio data file.

4. The computer-implemented method of claim 1, further comprising training the model to identify sequences of words in partial transcriptions that are expected to be stable, wherein the training includes:
  obtaining training audio data files;
  identifying, from among the training audio data files, a plurality of training audio data files with audio recorded in the first language;
  for each training audio data file in the plurality of training audio data files:
    generating a partial transcription of the audio in the training audio data file at a plurality of successive time intervals, wherein each partial transcription (1) is a transcription of the audio from a beginning of the audio until a particular time interval and (2) is in the first language; and
    generating a chronological list of partial transcriptions that are ordered from earliest to latest relative to the beginning of the audio; and
  generating a chronological list of translated partial transcriptions corresponding to the chronological list of partial transcriptions, including: for each partial transcription in the chronological list of partial transcriptions, translating the partial transcription into the second language; and
  for each translated partial transcription, beginning with a first translated partial transcription in the chronological list of translated partial transcriptions:
    generating, using positions of words in the translated partial transcription and other translated partial transcriptions, a stability value identifying a portion of the translated partial transcription that is stable; and
    training the model using the translated partial transcription as an input of the model and the stability value as an output of the translation stability model.

5. The computer-implemented method of claim 4, wherein generating the stability value includes:
  computing a correctness probability for each word in the translated partial transcription, wherein the correctness probability measures the probability that a word at a particular position of the translated partial transcription appears at the particular position in one or more other translated partial transcriptions that appear after the translated partial transcription in the chronological list of translated partial transcriptions; and
  generating the stability value for the translated partial transcription using the correctness probability for each word in the translated partial transcription.

6. The computed implemented method of claim 5, wherein computing the correctness probability for each word in the translated partial transcription, includes:
  for each word in the translated partial transcription:
    determining a particular position of the word in the translated partial transcription;
    computing a first value, wherein the first value is a number of partial translated transcriptions that are listed after the translated partial transcription in the chronological list of translated partial transcriptions;
    computing a second value, wherein the second value specifies a number of times that the word appears at the particular position in translated partial transcriptions appearing after the translated partial transcription in the chronological list of translated partial transcriptions; and
    dividing the second value by the first value to obtain the correctness probability of the word.

7. The computer-implemented method of claim 4, wherein generating the stability value includes:
  computing a change frequency metric for each word in the translated partial transcription, wherein the change frequency metric measures a number of times that a word at a particular position of the translated partial transcription changes at the particular position in translated partial transcriptions that are listed after the translated partial transcription in the chronological list of translated partial transcriptions; and
  generating the stability value for the translated partial transcription using the change frequency metric for each word in the translated partial transcription.

8. The computer-implemented method of claim 4, wherein generating the stability value includes:
- computing an equal-to-last metric for each word in the partial transcription, wherein the equal-to-last metric identifies whether a position of a word in the partial transcription is the same as a position of the word in a partial transcription that appears last on the chronological list of translated partial transcriptions; and
- generating the stability value for the translated partial transcription using the equal-to-last metric for each word in the translated partial transcription.

9. A system comprising:
one or more memory devices storing instructions; and
one or more data processing apparatus that are configured to interact with the one or more memory devices, and upon execution of the instructions, perform operations including:
- obtaining an audio data stream;
- determining a first language in which audio in the audio data stream is recorded;
- generating a partial transcription of the audio at a plurality of successive time intervals, wherein each partial transcription (1) is a transcription of the audio from a beginning of the audio until a particular time interval and (2) is in the first language;
- for each successive particular partial transcription:
  - translating the particular partial transcription into the second language; and
  - for each word of the translated particular partial transcription, computing a stability value for the word by determining whether a position of the word in the translated particular partial transcription matches a position of the word in a threshold number of translated partial transcriptions within a set of translated partial transcriptions that precede the translated particular partial transcription;
  - generating, using a machine learning model, a stability value for the translated particular partial transcription using the computed stability values for the words in the translated particular partial transcription, wherein the stability value for the translated particular partial transcription identifies a portion of the particular translated partial transcription that is stable, wherein the machine learning model is trained to minimize a loss function and is trained using a set of translations of transcriptions generated from one or more training audio data files recorded in the first language and a corresponding set of stability values that each indicate whether a respective set translation is stable, wherein the set of stability values are generated using a set of rules; and
  - in response to generating the stability value, providing, for display on a user device, the portion of the translated particular partial transcription.

10. The system of claim 9, wherein a stability value for a training audio data file from the one or more training audio data files is generated using positions of words in the respective translated partial transcription and other translated partial transcriptions for the training audio data file.

11. A system, comprising:
one or more memory devices storing instructions; and
one or more data processing apparatus that are configured to interact with the one or more memory devices, and upon execution of the instructions, perform operations including:
- receiving, from a client device, a content request;
- obtaining an audio data stream;
- determining a first language in which audio in the audio data stream is recorded;
- generating, at each time interval in a plurality of successive time intervals, a partial transcription of the audio, wherein each partial transcription (1) is a transcription of the audio from a beginning of the audio until a particular time interval and (2) is in the first language; and
- for each partial transcription:
  - translating the partial transcription into a second language that is different from the first language;
  - inputting the translated partial transcription into a model, wherein the model determines whether a portion of an input translated partial transcription is stable, wherein a portion of an input translated partial transcription is stable when the portion of the input translated partial transcription is not expected to change in another translated partial transcription of audio recorded until a time interval that is later than the time interval for the input partial transcription;
  - identifying, by the model and based on the input translated partial transcription, a portion of the translated partial transcription as stable; and
  - in response to identifying the portion of the translated partial transcription as stable, providing, for display on a user device and using the identification, the portion of the translated partial transcription,
wherein the model is trained based upon translations of transcriptions generated from one or more training audio data files recorded in the first language, and
wherein the transcriptions generated from one or more training data audio files comprises, for each training audio data file, a plurality of partial transcriptions of the training audio data file, each partial transcription of a training audio data file being generated at a respective one of a plurality of successive time intervals, wherein each partial transcription (1) is a transcription of the audio from a beginning of the audio until a particular time interval and (2) is in the first language.

12. The system of claim 11, wherein the one or more data processing apparatus are configured to perform operations further comprising training the model to identify sequences of words in partial transcriptions that are expected to be stable, wherein the training includes:
- obtaining training audio data files;
- identifying, from among the training audio data files, a plurality of training audio data files with audio recorded in the first language;
for each training audio data file in the plurality of training audio data files:
- generating a partial transcription of the audio in the training audio data file at a plurality of successive time intervals, wherein each partial transcription (1) is a transcription of the audio from a beginning of the audio until a particular time interval and (2) is in the first language; and
- generating a chronological list of partial transcriptions that are ordered from earliest to latest relative to the beginning of the audio;
- generating a chronological list of translated partial transcriptions corresponding to the chronological list of partial transcriptions, including: for each partial transcription in the chronological list of partial transcriptions, translating the partial transcription into the second language; and for each translated partial transcription, beginning with a first translated partial transcription in the chronological list of translated partial transcriptions:
  generating, using positions of words in the translated partial transcription and other translated partial transcriptions, a stability value identifying a portion of the translated partial transcription that is stable; and
  training the model using the translated partial transcription as an input of the model and the stability value as an output of the translation stability model.

13. The system of claim 12, wherein generating the stability value includes:
  computing a correctness probability for each word in the translated partial transcription, wherein the correctness probability measures the probability that a word at a particular position of the translated partial transcription appears at the particular position in one or more other translated partial transcriptions that appear after the translated partial transcription in the chronological list of translated partial transcriptions; and
  generating the stability value for the translated partial transcription using the correctness probability for each word in the translated partial transcription.

14. The system of claim 12, wherein generating the stability value includes:
  computing a change frequency metric for each word in the translated partial transcription, wherein the change frequency metric measures a number of times that a word at a particular position of the translated partial transcription changes at the particular position in translated partial transcriptions that are listed after the translated partial transcription in the chronological list of translated partial transcriptions; and
  generating the stability value for the translated partial transcription using the change frequency metric for each word in the translated partial transcription.

15. The system of claim 12, wherein generating the stability value includes:
  computing an equal-to-last metric for each word in the partial transcription, wherein the equal-to-last metric identifies whether a position of a word in the partial transcription is the same as a position of the word in a partial transcription that appears last on the chronological list of translated partial transcriptions; and
  generating the stability value for the translated partial transcription using the equal-to-last metric for each word in the translated partial transcription.

16. A non-transitory computer readable medium, storing instructions that, when executed by one or more data processing apparatus, cause the one or more data processing apparatus to perform operations comprising:
  obtaining an audio data stream;
  determining a first language in which audio in the audio data stream is recorded;
  generating, at each time interval in a plurality of successive time intervals, a partial transcription of the audio, wherein each partial transcription (1) is a transcription of the audio from a beginning of the audio until a particular time interval and (2) is in the first language;
for each partial transcription:
  translating the partial transcription into a second language that is different from the first language;
  inputting the translated partial transcription into a model, wherein the model determines whether a portion of an input translated partial transcription is stable, wherein a portion of an input translated partial transcription is stable when the portion of the input translated partial transcription is not expected to change in another translated partial transcription of audio recorded until a time interval that is later than the time interval for the input partial transcription;
  identifying, by the model and based on the input translated partial transcription, a portion of the translated partial transcription as stable; and
  in response to identifying the portion of the translated partial transcription as stable, providing, for display on a user device and using the identification, the portion of the translated partial transcription,
wherein the model is trained based upon translations of transcriptions generated from one or more training audio data files recorded in the first language, and
wherein the transcriptions generated from one or more training data audio files comprises, for each training audio data file, a plurality of partial transcriptions of the audio data file, each partial transcription of a training audio data file being generated at a respective one of a plurality of successive time intervals, wherein each partial transcription (1) is a transcription of the audio from a beginning of the audio until a particular time interval and (2) is in the first language.

* * * * *